(12) United States Patent
Toguri et al.

(10) Patent No.: US 11,204,071 B2
(45) Date of Patent: Dec. 21, 2021

(54) DISC BRAKE (71) Applicant: HITACHI AUTOMOTIVE SYSTEMS, LTD., Ibaraki (JP)

(72) Inventors: Naoki Toguri, Minami-Alps (JP); Yuki Sato, Chuo (JP); Katsuhiro Takahashi, Minami-Alps (JP); Satoshi Nakamura, Minami-Alps (JP); Dian Utama Akmal, Minami-Alps (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 59 days.

(21) Appl. No.: 16/625,892

(22) PCT Filed: May 24, 2018

(86) PCT No.: PCT/JP2018/019971
§ 371 (c)(1),
(2) Date: Dec. 23, 2019

(87) PCT Pub. No.: WO2019/003735
PCT Pub. Date: Jan. 3, 2019

(65) Prior Publication Data
US 2021/0156438 A1 May 27, 2021

(30) Foreign Application Priority Data
Jun. 30, 2017 (JP) .............................. JP2017-128874

(51) Int. Cl.
*F16D 65/097* (2006.01)
*F16D 55/226* (2006.01)
(Continued)

(52) U.S. Cl.
CPC ....... *F16D 65/0977* (2013.01); *F16D 55/226* (2013.01); *F16D 65/0068* (2013.01); *F16D 2055/0016* (2013.01)

(58) Field of Classification Search
CPC ..... F16D 65/095; F16D 65/0972; F16D 65/40
(Continued)

(56) References Cited

U.S. PATENT DOCUMENTS

| | | | | |
|---|---|---|---|---|
| 2006/0260884 A1* | 11/2006 | Hayashi | .............. | F16D 65/0972 188/71.1 |
| 2007/0251772 A1* | 11/2007 | Tsurumi | ................ | F16D 65/095 188/73.38 |
| 2010/0147635 A1* | 6/2010 | Hayashi | .............. | F16D 65/0972 188/73.38 |

FOREIGN PATENT DOCUMENTS

JP      2008-298198      12/2008

OTHER PUBLICATIONS

Written Opinion of the International Searching Authority dated Jul. 10, 2018 in International (PCT) Application No. PCT/JP2018/019971 with English translation.
(Continued)

*Primary Examiner* — Christopher P Schwartz
(74) *Attorney, Agent, or Firm* — Wenderoth, Lind & Ponack, L.L.P.

(57) ABSTRACT

At least one of a pair of pad springs includes a guide plate portion for guiding an ear portion of a corresponding friction pad in a disc axial direction. The guide plate portion includes a first plate portion, a second plate portion, and a bottom plate apportion. A radially biasing portion is configured to elastically bias the ear portion of the friction pad toward the first plate portion; and a rotational direction biasing portion is configured to bias the friction pad in a rotational direction of a disc. The second plate portion is provided with an open portion at a position shifted inward from a middle position in the disc axial direction. The rotational direction biasing portion includes a main biasing portion configured to bias the friction pad inward in the disc rotational direction, and
(Continued)

a sub biasing portion arranged across the open portion away from the main biasing portion.

4 Claims, 7 Drawing Sheets

(51) Int. Cl.
  *F16D 65/00* (2006.01)
  *F16D 55/00* (2006.01)
(58) Field of Classification Search
  USPC .................. 188/71.1, 73.31, 73.35–73.38
  See application file for complete search history.

(56) References Cited

OTHER PUBLICATIONS

International Search Report dated Jul. 10, 2018 in International (PCT) Application No. PCT/JP2018/019971 with English translation.

* cited by examiner

DISC BRAKE

TECHNICAL FIELD

The invention relates to a disc brake that applies a braking force to a vehicle, such as an automobile.

BACKGROUND ART

A disc brake disposed in a vehicle, such as an automobile, generally comprises a mounting member that includes a pair of arm portions spaced away from each other in a rotational direction of a disc and extending over an outer circumferential side of the disc in an axial direction of the disc, the arm portions being provided with pad guides, a caliper slidably disposed in the arm portions of the mounting member, a pair of friction pads that includes ear portions inserted in the pad guides of the mounting member and is pressed by the caliper against both surfaces of the disc, and a pad spring mounted on the mounting member on a side where at least one of the arm portions is located, the pad spring being configured to elastically support the friction pad between the arm portions. The pad spring is provided with a rotational direction biasing portion that biases the friction pad inward in the disc rotational direction (toward the center of the friction pads) (Patent Literature 1, for example).

CITATION LIST

Patent Literature

PTL 1: Japanese Patent Application Publication (Kokai) No. 2008-298198

SUMMARY OF INVENTION

Technical Problem

The aforementioned conventional rotational direction biasing portion of the pad spring applies a constant biasing force to the friction pad, whether the friction pad is new or abraded. When abraded, however, the friction pad is decreased in mass and might be applied with an excessive biasing force by the rotational direction biasing portion.

An object of the invention is to reduce generation of abnormal noises including a brake noise, a clonking noise, and other like noises.

Solution to Problem

One embodiment of the invention provides a disc brake. The disc brake comprises a mounting member including a pair of arm portions spaced away from each other in a rotational direction of a disc and extending over an outer circumferential side of the disc in a disc axial direction, the arm portions being provided with pad guides; a caliper slidably disposed in the arm portions of the mounting member; a pair of friction pads including ear portions inserted in the pad guides of the mounting member, the pair of friction pads being pressed by the caliper against both surfaces of the disc; and a pair of pad springs mounted on the arm portions of the mounting member and configured to elastically support the pair of friction pads between the arm portions. At least one of the pair of pad springs includes a guide plate portion for guiding the ear portion of a corresponding one of the pair of friction pads in the disc axial direction, the guide plate portion including a first plate portion extending in the disc axial direction along a radially outer surface of the ear portion, a second plate portion extending in the disc axial direction along a radially inner surface of the ear portion, and a bottom plate portion extending in the disc axial direction along an inner surface of the ear portion in a rotational direction; a radially biasing portion including a proximal end side formed integrally with the second plate portion and a distal end side, the radially biasing portion extending in the disc axial direction between the second plate portion and the ear portion of the friction pad with the distal end side elastically deformed to elastically bias the ear portion of the friction pad toward the first plate portion; and a rotational direction biasing portion that is so formed as to be bent inward in a disc radial direction from an inner end of the second plate portion in the disc rotational direction, the rotational direction biasing portion being configured to bias the friction pads in the disc rotational direction. The second plate portion is provided with an open portion at a position shifted inward from a middle position in the disc axial direction. The rotational direction biasing portion includes a main biasing portion arranged further outside than the open portion in the disc axial direction and configured to bias the friction pad inward in the disc rotational direction and a sub biasing portion arranged across the open portion away from the main biasing portion further inside in the disc axial direction than the main biasing portion and configured to bias the friction pad inward in the disc rotational direction with a smaller force than the main biasing portion.

One embodiment of the invention provides a disc brake. The disc brake comprises a mounting member including pad guides in which ear portions of a pair of friction pads are arranged, the pad guides being spaced away from each other in a rotational direction of a disc; a caliper slidably disposed in arm portions of the mounting member and configured to press the pair of friction pads against both surfaces of the disc; and a pair of pad springs mounted on the pad guides of the mounting member and configured to elastically support the pair of friction pads. At least one of the pair of pad springs includes a guide plate portion in which the ear portion of a corresponding one of the pair of friction pads is arranged, the guide plate portion being larger than the ear portion in length in the disc axial direction; and a rotational direction biasing portion extending from the guide plate portion toward a center in the disc rotational direction and configured to bias the corresponding friction pad in the disc rotational direction. The guide plate portion includes a bottom plate portion disposed opposite an end surface of the ear portion in the disc rotational direction, and a first plate portion and a second plate portion which are disposed across the bottom plate portion from each other in a disc radial direction. A pair of leg portions is formed in the second plate portion arranged on an inner side in the disc radial direction so that the leg portions are spaced away from each other in the disc axial direction. The pair of leg portions extends from the bottom plate portion and includes distal ends connected to the rotational direction biasing portion. The pair of leg portions includes a first leg portion located away from the disc. The first leg portion is formed larger in the length in the disc axial direction than a second leg portion located closer to the disc.

One embodiment of the invention provides a disc brake. The disc brake comprises a mounting member including a pair of arm portions spaced away from each other in a rotational direction of a disc and extending over an outer circumferential side of the disc in a disc axial direction, the arm portions being provided with pad guides; a caliper slidably disposed in the arm portions of the mounting member; a pair of friction pads including ear portions inserted in the pad guides of the mounting member, the pair of friction pads being pressed by the caliper against both surfaces of the disc; and a pair of pad springs mounted on the arm portions of the mounting member and configured to elastically support the pair of friction pads between the arm portions. The pair of pad springs each of which includes a guide plate portion in which the ear portion of a corresponding one of the pair of friction pads is arranged, the guide plate portion being larger in length in the disc axial direction than the ear portion, and a rotational direction biasing portion extending from the guide plate portion toward a center in the disc rotational direction and configured to bias the friction pads in the disc rotational direction. The guide plate portion includes a bottom plate portion disposed opposite an end surface of the ear portion in the disc rotational direction, and a first plate portion and a second plate portion which are disposed across the bottom plate portion from each other in a disc radial direction. An open portion is formed in the second plate portion arranged on an inner side in the disc radial direction. A middle position of the open portion in the disc axial direction is arranged closer to the disc than a middle position of the second plate portion in the disc axial direction.

The embodiments of the invention reduce generation of abnormal noises including a brake noise, a clonking noise, and other like noises.

DESCRIPTION OF EMBODIMENTS

Disc brakes according to embodiments of the invention are discussed below in detail with reference to FIGS. 1 to 7.

Figure 1:
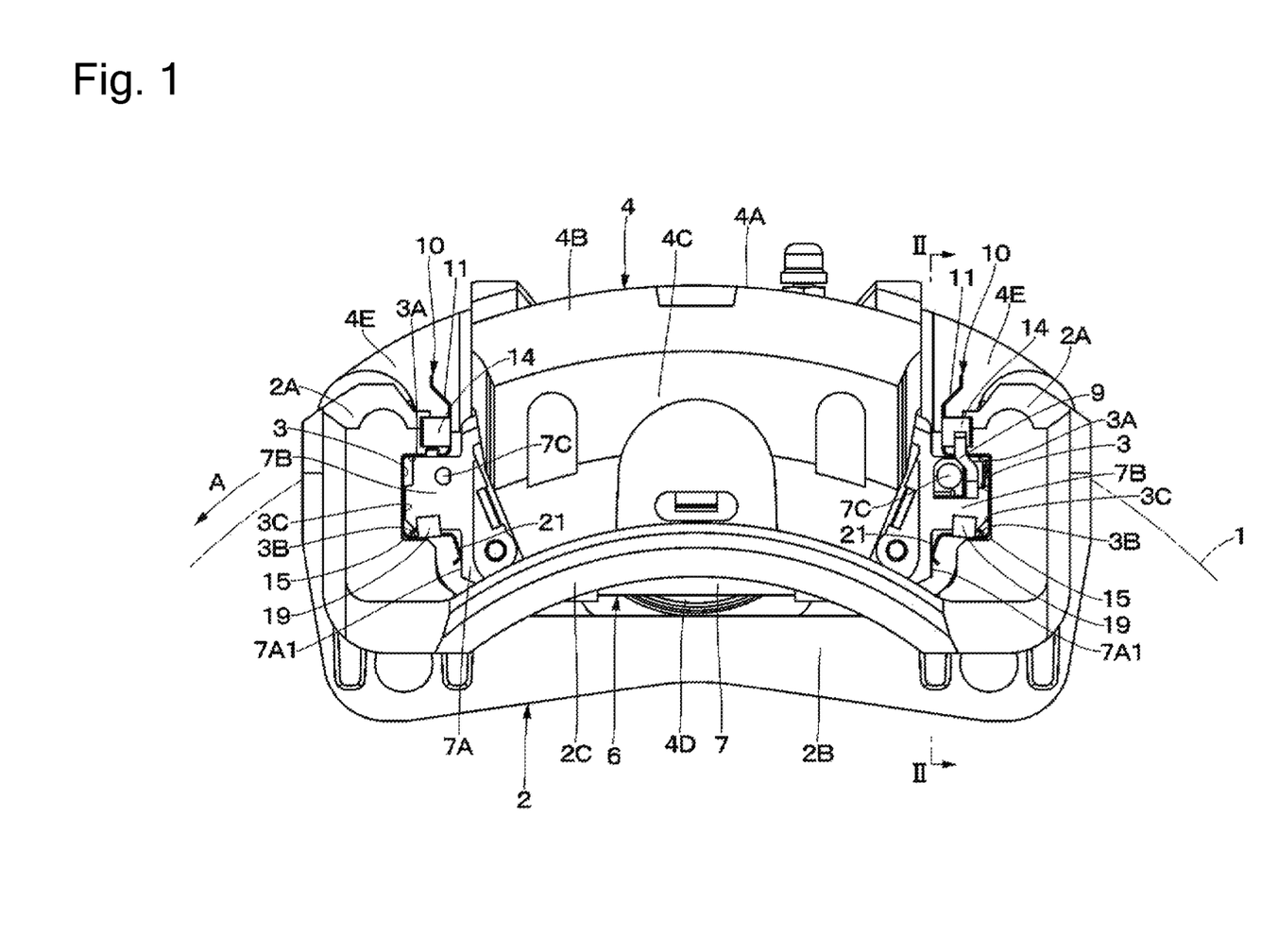
FIG. 1 is an elevation view of a disc brake according to an embodiment of the invention.

A disc 1 illustrated in FIG. 1, for example, rotates in a direction of an arrow A in FIG. 1 together with a wheel, not shown, when a vehicle travels forward, and rotates in an opposite direction to the direction of the arrow A when the vehicle travels backward. In this specification, a right-and-left direction in FIG. 1 is referred to as a disc rotational direction (circumferential direction), and an up-and-down direction in FIG. 1 as a disc radial direction. A right-and-left direction in FIG. 2 is referred to as a disc axial direction.

A mounting member 2 is mounted on a non-rotary portion of the vehicle. As illustrated in FIGS. 1 and 2, the mounting member 2 comprises a pair of arm portions 2A, 2A spaced away from each other in the disc rotational direction 1 and extending over an outer circumferential side of the disc 1 in the disc axial direction and a bearing portion 2B having a large thickness which is so disposed as to integrally connect proximal end sides of the arm portions 2A and fixed to the non-rotary portion of the vehicle at a position on an inner side of the disc 1. One of the arm portions 2A is located on the right side of FIG. 1, that is, an inward-rotation side of the disc 1 that rotates in the direction of the arrow A (hereinafter, referred to as a disc inward-rotation side). The other arm portion 2A is located on the left side of FIG. 1, that is, an outward-rotation side of the disc 1 that rotates in the direction of the arrow A (hereinafter, referred to as a disc outward-rotation side).

Formed in the mounting member 2 is a reinforcing beam 2C that connects distal end sides of the arm portions 2A at a position located on an outer side of the disc 1. The arm portions 2A of the mounting member 2 are thus integrally connected together through the bearing portion 2B on the inner side of the disc 1 and also integrally connected together through the reinforcing beam 2C on the outer side of the disc 1.

Figure 2:
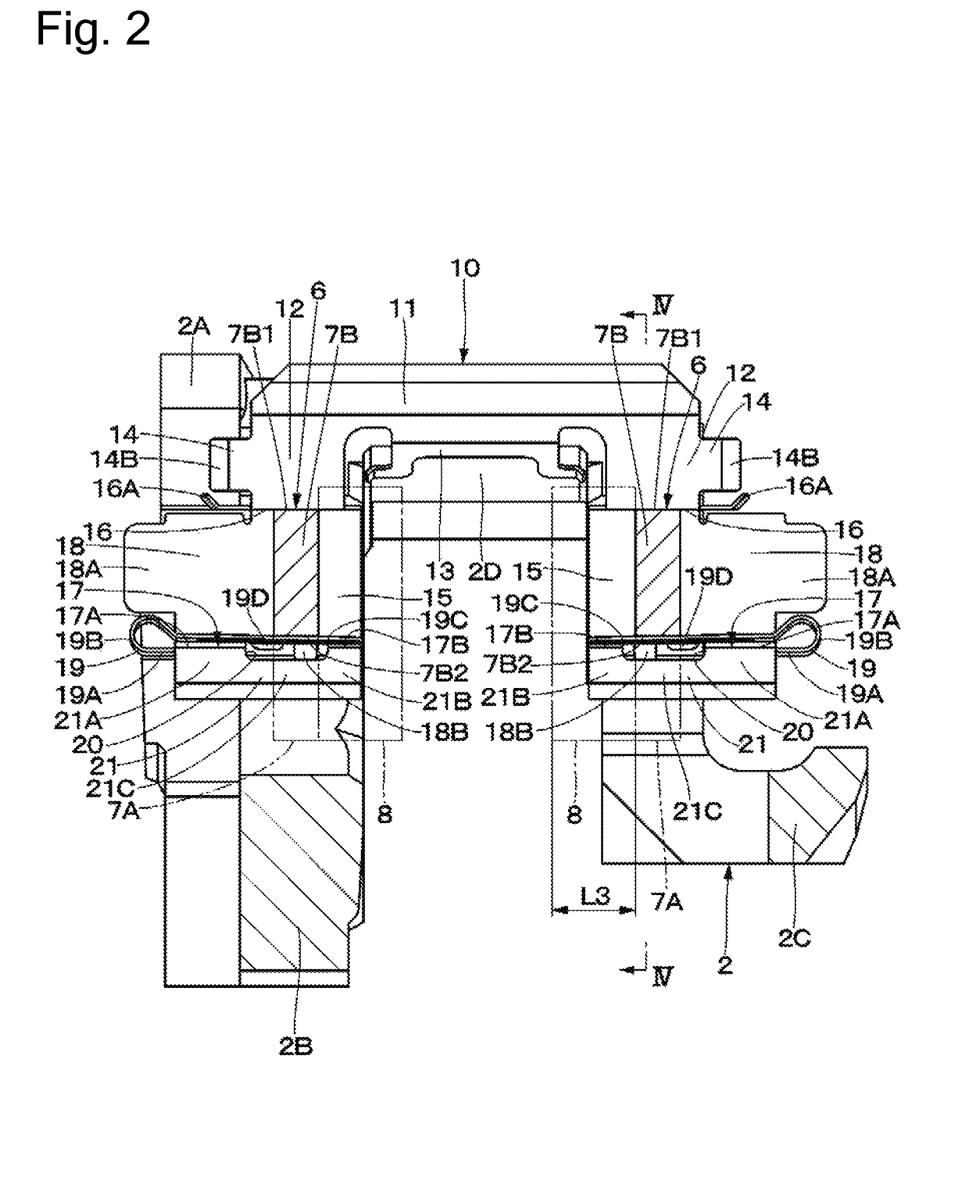
FIG. 2 is an enlarged sectional view of a mounting member, new friction pads, and a pad spring viewed in a direction of arrows II—II in FIG. 1 with a caliper and a return spring detached.
Figure 3:
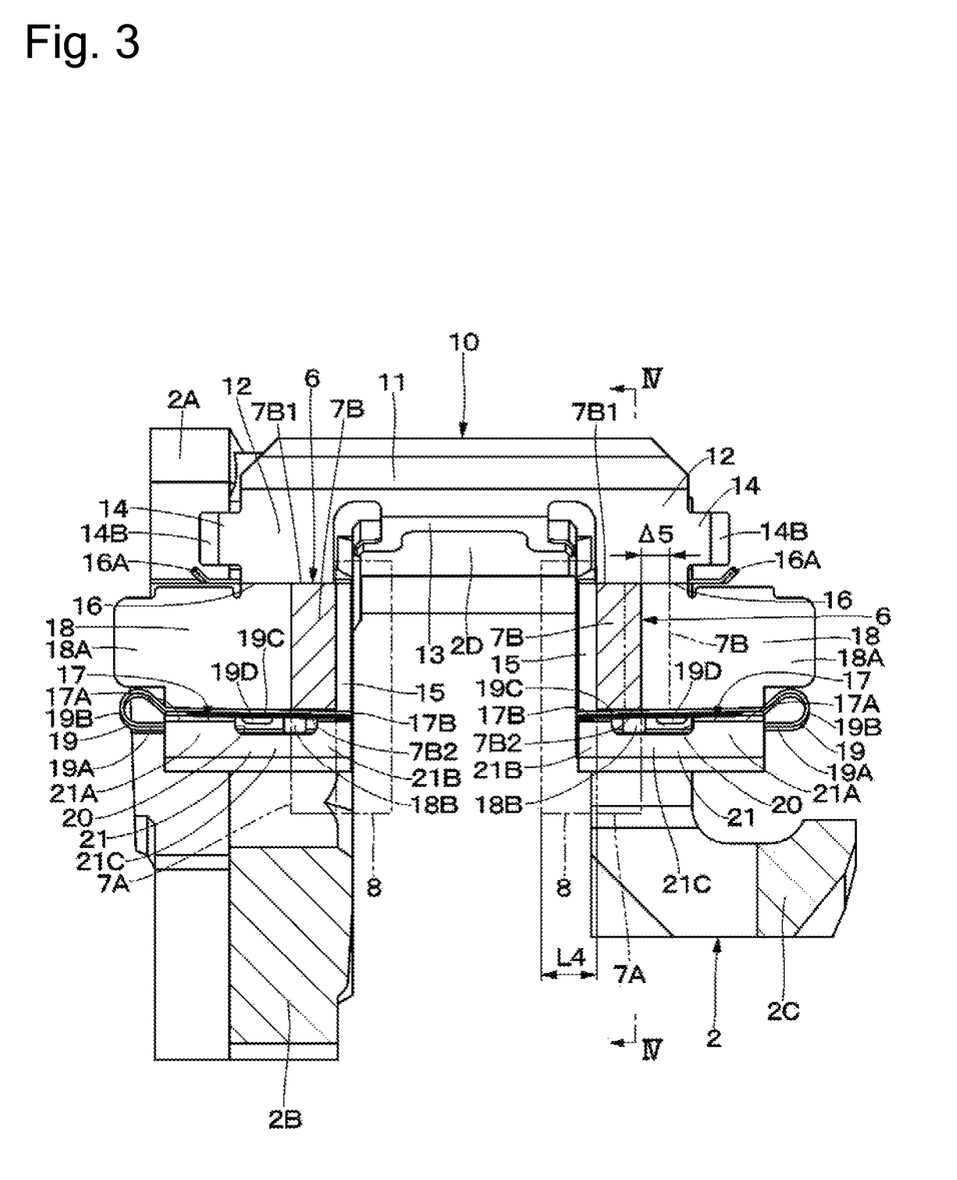
FIG. 3 is a similar enlarged sectional view to FIG. 2, which shows a mounting member, abraded friction pads, and a pad spring with a caliper and a return spring detached.

Formed in each of the arm portions 2A of the mounting member 2 is a disc pass portion 2D (only one of the arm portions 2A is shown in FIGS. 2 and 3). The disc pass portion 2D is located at a middle position in the axial direction of the disc 1 and extends in an arc-like shape along an outer circumference (rotation locus) of the disc 1. Each of the arm portions 2A is provided, for example, with a pin hole 2E shown by a dotted line in FIG. 4. A sliding pin 5 described later is slidably inserted in the corresponding pin hole 2E.

Figure 4:
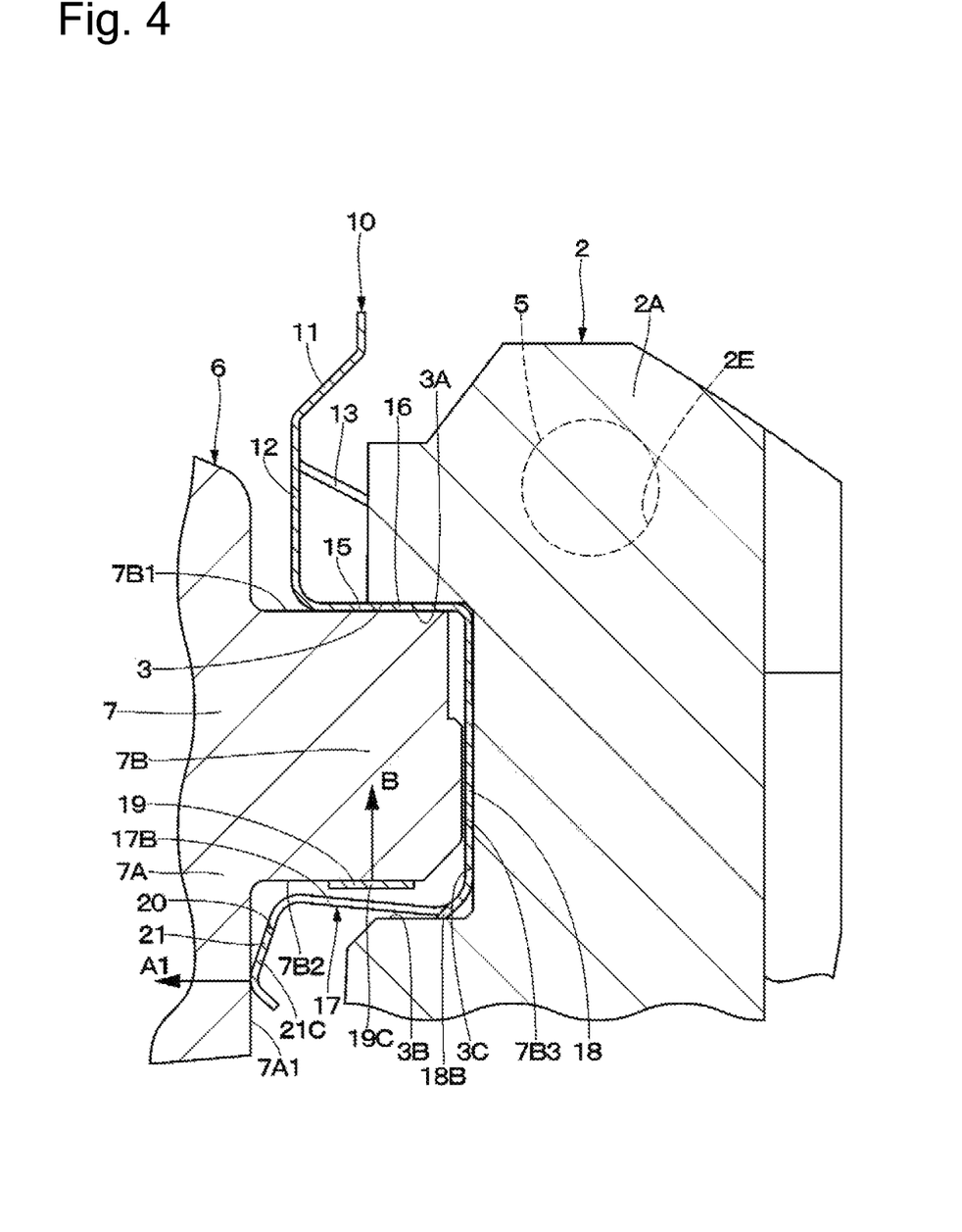
FIG. 4 is an enlarged sectional view of the mounting member, the friction pads, and the pad spring viewed in a direction of arrows IV—IV in FIG. 2.

A pad guide 3 is disposed in each of the arm portions 2A of the mounting member 2. The pad guide 3 is formed into a recessed groove having a U-like section as illustrated in FIGS. 1 and 4 and extends in such a direction that a friction pad 6 described later is displaced in a sliding manner (disc axial direction). The pad guide 3 is located on each side of the disc pass portion 2D in the axial direction. The pad guides 3 are arranged on the proximal end side (inner side) and the distal end side (outer side) of the arm portion 2A.

The pad guide 3 comprises an outer wall portion 3A located on an outer side in the disc radial direction, an inner wall portion 3B located on an inner side in the disc radial direction, and a bottom portion 3C that connects the outer wall portion 3A and the inner wall portion 3B on a recess side (outer side in the disc rotational direction) as illustrated in FIG. 4. The pad guide 3 has a U-like section formed of the outer wall portion 3A, the inner wall portion 3B, and the bottom portion 3C. The outer wall portion 3A and the inner wall portion 3B are arranged in parallel vertically away from each other as viewed in FIG. 4.

The pad guide 3 is so formed as to hold an ear portion 7B of the friction pad 6 described later between the outer wall portion 3A and the inner wall portion 3B in a vertical direction (disc radial direction), to thereby guide the friction pad 6 in the disc axial direction between the outer wall portion 3A and the inner wall portion 3B. The bottom portion 3C of the pad guide 3 functions as a so-called torque receiving portion and receives, through the ear portion 7B described later, a braking torque applied from the disc 1 onto the friction pad 6 when the brake is applied.

A caliper 4 is slidably disposed in the mounting member 2. As illustrated in FIG. 1, the caliper 4 comprises an inner leg portion 4A disposed on the inner side that is one side of the disc 1, a bridge portion 4B extending from the inner leg portion 4A to the outer side that is the other side of the disc 1 over the outer circumferential side of the disc 1 between the arm portions 2A of the mounting member 2, and an outer leg portion 4C extending from the outer side that is a distal end side of the bridge portion 4B toward the inner side in the radial direction of the disc 1 and configured to function as a claw portion with a two-pronged distal end side.

A cylinder, not shown, is formed in the inner leg portion 4A of the caliper 4. The piston 4D is slidably inserted in the cylinder. The inner leg portion 4A is provided with a pair of mount portions 4E, 4E protruding in right and left directions as viewed in FIG. 1. The mount portions 4E are provided so that the entire caliper 4 is slidably supported by the arm portions 2A of the mounting member 2 through sliding pins 5 described later.

The sliding pins 5 are fastened to the mount portions 4E of the caliper 4 with bolts. Each of the sliding pins 5 has a distal end side extending toward the pin hole 2E of the corresponding arm portion 2A of the mounting member 2 and slidably inserted in the pin hole 2E as illustrated by the dotted line in FIG. 4. The caliper 4 is thus slidably supported by the arm portions 2A of the mounting member 2 through the sliding pins 5.

The friction pad 6 on the inner side and the friction pad 6 on the outer side are arranged opposite respective surfaces of the disc 1. The friction pads 6 are pressed against the disc 1 by the caliper 4. The friction pads 6 each comprise a flat plate-like backing plate 7 extending in the disc rotational direction (circumferential direction) into a substantially fan-like shape and a lining 8 as a friction material that is firmly fixed to a surface of the backing plate 7 and comes into a frictional contact with the disc 1.

The backing plate 7 of the friction pad 6 comprises a main body portion 7A and ear portions 7B, 7B located at respective ends of the main body portion 7A in the disc rotational direction and each having a convex shape. The lining 8 that is the friction material is firmly fixed to a surface (surface facing the disc 1) of the main body portion 7A. Flat contact surface portions 7A1 are formed at respective sides (disc inward-rotation side and outward-rotation side) of the main body portion 7A in a length direction of the main body portion 7A. The contact surface portions 7A1 extend in a substantially perpendicular direction to protruding directions of the ear portions 7B and at the same time inward in the disc radial direction as illustrated in FIG. 1. The contact surface portion 7A1 extends inward in the disc radial direction from a proximal end of a radially inner surface 7B2 of the ear portion 7B.

A rotational direction biasing portion 21 of each pad spring 10 described later comes into elastic contact with the contact surface portion 7A1. The friction pad 6 is thus constantly biased inward in the disc rotational direction (direction of an arrow A1 in FIG. 4) by the rotational direction biasing portion 21 of the pad spring 10 located on the disc inward-rotation side. The friction pad 6 is further constantly biased inward in the disc rotational direction (opposite to the direction of the arrow A1) by the rotational direction biasing portion 21 of the pad spring 10 located on the disc outward-rotation side. The friction pad 6 is therefore arranged to be centered at a center in the disc rotational direction when a braking force is not applied (without brake application). In other words, when the braking force is not applied, the ear portions 7B of the friction pad 6 are not pressed by any of the bottom portions 3C of the pad guides 3 located on the disc inward-rotation side and outward-rotation side, which means that the ear portions 7B are slightly away from the bottom portions 3C.

The ear portions 7B of the friction pad 6 (backing plate 7) are, for example, symmetrically formed to have the same shape as illustrated in FIG. 1. In such a case, one of the ear portions 7B is arranged on the disc inward-rotation side and functions as a torque transmission portion that comes into contact with the bottom portion 3C of the pad guide 3 on the disc inward-rotation side to transmit a braking torque received by the friction pad 6 from the disc 1 when the brake is applied on the vehicle traveling backward. The other ear portion 7B is arranged on the disc outward-rotation side and functions as a torque transmission portion that comes into contact with the bottom portion 3C of the pad guide 3 on the disc outward-rotation side to transmit a braking torque received by the friction pad 6 from the disc 1 when the brake is applied on the vehicle traveling forward.

Each of the ear portions 7B of the backing plate 7 is slidably inserted in the corresponding pad guide 3 of the mounting member 2 through a guide plate portion 15 of the pad spring 10 described later. The friction pads 6 on the inner and outer sides are pressed against the respective surfaces of the disc 1 by the caliper 4 when the brake is applied. At this time, the ear portions 7B of the backing plate 7 are displaced along the pad guides 3 in a sliding manner in the axial direction of the disc 1.

Each of the ear portions 7B of the backing plate 7 includes a radially outer surface 7B1 located on the outer side in the disc radial direction, the radially inner surface 7B2 located on the inner side in the disc radial direction, and a rotational direction lateral surface (disc rotational direction end surface) 7B3 located on the outer side in the disc rotational direction to connect the radially outer surface 7B1 and the radially inner surface 7B2.

The radially outer surface 7B1 of each of the ear portions 7B comes into contact with a first plate portion 16 of the guide plate portion 15 while inserted in the guide plate portion 15 of the pad spring 10 described later. In other words, the radially outer surface 7B1 forms a lateral surface located on the side where the outer wall portion 3A of the pad guide 3 is. The radially inner surface 7B2 of each of the ear portions 7B comes into contact with a radially biasing portion 19 of the pad spring 10 while inserted in the guide plate portion 15 of the pad spring 10 described later. In other words, the radially inner surface 7B2 forms a lateral surface located on the side where the inner wall portion 3B of the pad guide 3 is. The rotational direction lateral surface (disc rotational direction end surface) 7B3 of each of the ear portions 7B comes into contact with or faces a bottom plate portion 18 of the guide plate portion 15 while inserted in the guide plate portion 15 of the pad spring 10 described later. In other words, the rotational direction lateral surface 7B3 forms a lateral surface located on the side where the bottom portion 3C of the pad guide 3 is.

A protrusion 7C is disposed in each of the ear portions 7B of the backing plate 7 of the friction pad 6 closely to a proximal end of the corresponding ear portion 7B. The protrusion 7C is disposed in a protruding manner in a back surface (opposite surface to the side on which the lining 8 is disposed) of the backing plate 7. A return spring 9 described later is engaged (swaged) with the corresponding protrusion 7C.

The return spring 9 is swaged with the protrusion 7C located on the disc inward-rotation side of the friction pad 6 (see FIG. 1). The return spring 9 is formed by bending a spring material in the form of a metal plate. The return spring 9 has a proximal end that is fixed to the backing plate 7 of the friction pad 6. A distal end of the return spring 9 elastically contacts a return spring contact portion 14 of the pad spring 10 described later at a position further outside in the disc radial direction than the proximal end of the return spring 9. This allows the return spring 9 to constantly bias the friction pad 6 (backing plate 7) in a returning direction away from the disc 1 and stably return the friction pad 6 toward a return position (initial position, standby position), for example, when the vehicle's brake application is released.

The pad springs 10 mounted on the arm portions 2A of the mounting member 2 are discussed below.

Each of the pad springs 10 is mounted on the corresponding pad guide 3 of the mounting member 2. In other words, the pad springs 10 are mounted on the arm portions 2A of the mounting member 2, which are located on the disc inward-rotation side and the disc outward-rotation side. The pad springs 10 elastically support the friction pads 6 on the inner and outer sides and facilitate the sliding displacement of the friction pads 6.

Figure 5:
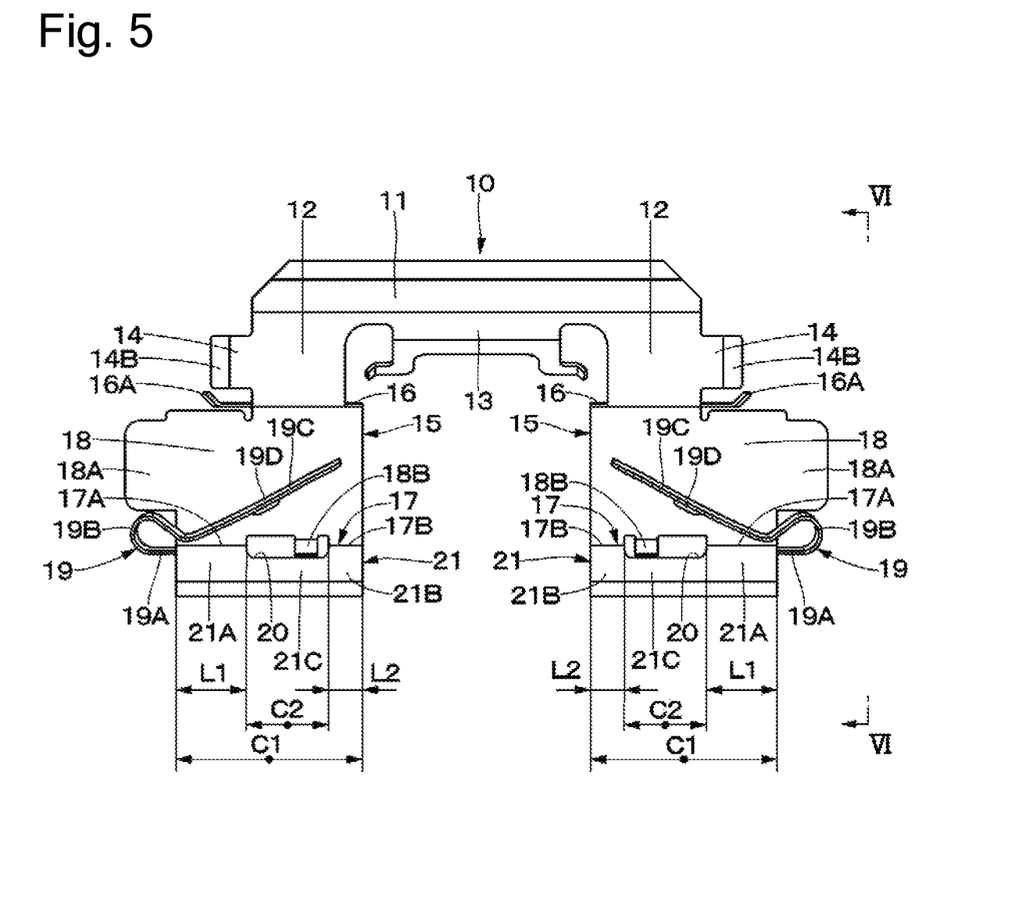
FIG. 5 is an elevation view showing the pad spring as a simple substance.
Figure 6:
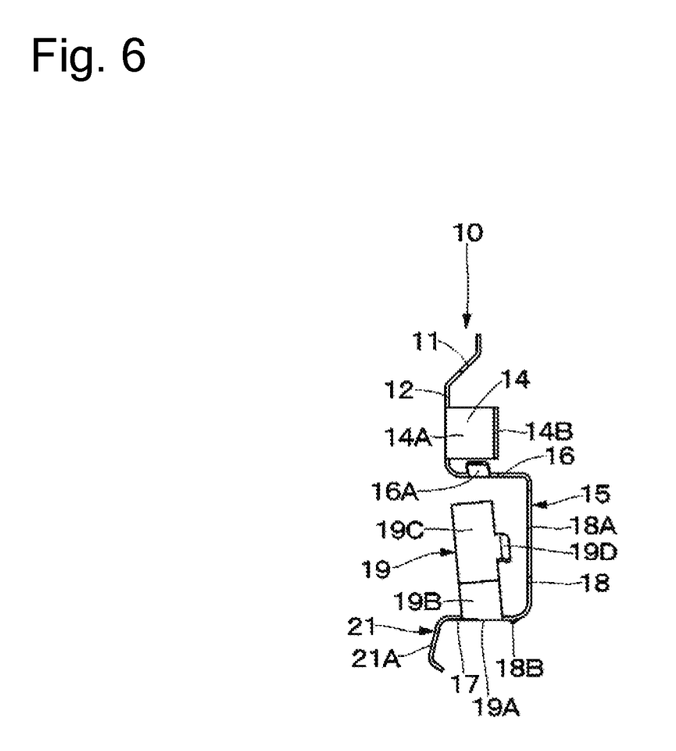
FIG. 6 is a lateral view of the pad spring shown in FIG. 5 as viewed in a direction of arrows VI—VI in FIG. 5.
Figure 7:
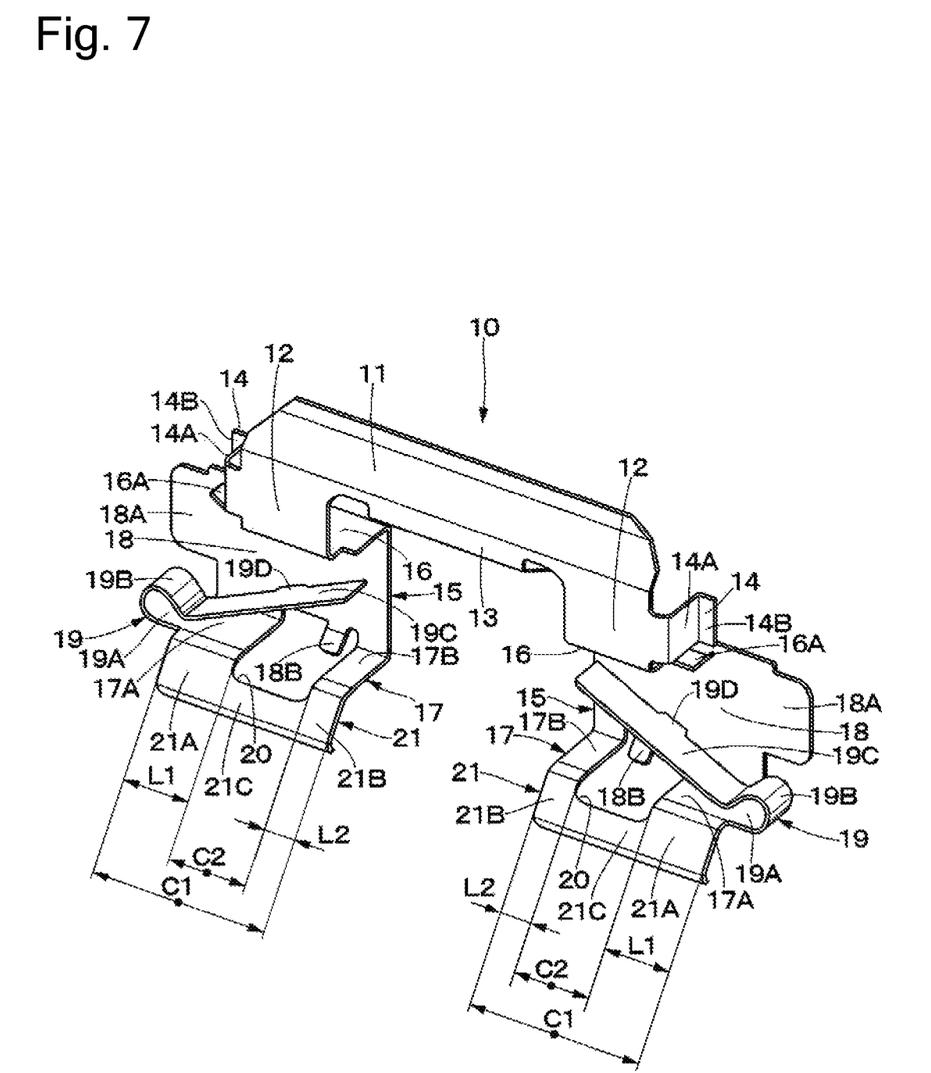
FIG. 7 is a perspective view showing the pad spring as a simple substance.

The pad springs 10 are integrally formed by bending a stainless steel plate with spring properties using a method such as stamping as illustrated in FIGS. 5 to 7. The pad springs 10 comprise a connecting plate portion 11, the guide plate portions 15, 15, the radially biasing portions 19, 19, the rotational direction biasing portions 21, 21, and the like.

The connecting plate portion 11 connects a flat plate portion 12 located on the inner side and a flat plate portion 12 located on the outer side. The connecting plate portion 11 therefore extends in the axial direction of the disc 1 over the outer circumferential side of the disc 1. In other words, the flat plate portions 12 are integrally formed in respective end sides of the connecting plate portion 11 in a length direction (disc axial direction) so as to extend in the disc radial direction. An engaging plate portion 13 is located between the flat plate portions 12 in a pair and integrally formed with the connecting plate portion 11. The engaging plate portion 13 is mounted on the mounting member 2 to be engaged with the disc pass portions 2D of the arm portions 2A. The pad springs 10 are thus positioned in the axial direction of the disc 1 relative to the arm portions 2A of the mounting member 2.

The return spring contact portions 14 extend outward in the disc rotational direction from the flat plate portions 12 and have distal end sides curved outward in the disc axial direction. In other words, each of the return spring contact portions 14 has a shape of letter L that is formed of a contact plate portion 14A extending outward in the disc rotational direction from the flat plate portion 12 and a curved plate portion 14B extending outward in the disc axial direction from a distal end of the contact plate portion 14A. A distal end side of the return spring 9 comes into contact with the contact plate portion 14A of the return spring contact portion 14.

When the brake is applied, and the friction pads 6 move toward the disc 1, a biasing force is generated in the return spring 9 in a direction away from the disc 1 (outward in the disc axial direction). When the brake application is released, the friction pads 6 are allowed to be separated away from the disc 1 due to the biasing force. The curved plate portion 14B covers a lateral side of the return spring 9 to prevent the distal end side of the return spring 9, which is in contact with the contact plate portion 14A, from being separated from the contact plate portion 14A.

The guide plate portions 15 are disposed in respective end sides of the connecting plate portion 11 with the flat plate portions 12 intervening therebetween. Each of the guide plate portions 15 is formed into a shape of letter U protruding outward in the disc rotational direction from an inner end of the corresponding flat plate portion 12 in the disc radial direction. One of the guide plate portions 15 is fitted in the pad guide 3 on the outer side. The ear portion 7B of the friction pad 6 located on the outer side is inserted in the one guide plate portion 15. The other guide plate portion 15 is fitted in the pad guide 3 on the inner side. The ear portion 7B of the friction pad 6 located on the inner side is inserted in the other guide plate portion 15. The guide plate portions 15 are intended to guide the ear portions 7B of the friction pad 6 (backing plate 7) in the disc axial direction.

Each of the guide plate portions 15 comprises the first plate portion 16 extending in the disc axial direction along the radially outer surface 7B1 of the ear portion 7B of the friction pad 6, a second plate portion 17 extending in the disc axial direction along the radially inner surface 7B2 of the ear portion 7B, and the bottom plate portion 18 extending in the disc axial direction along the rotational direction lateral surface 7B3 of the ear portion 7B. The first plate portion 16 is arranged outside in the disc radial direction, whereas the second plate portion 17 is arranged inside in the disc radial direction.

The first plate portion 16 of the guide plate portion 15 extends outward in the disc rotational direction so as to be bent at an angle of 90 degrees from an inner end of the flat plate portion 12 in the disc radial direction. The first plate portion 16 is in contact with the outer wall portion 3A of the pad guide 3. The radially outer surface 7B1 of the ear portion 7B of the friction pad 6 comes into contact with the first plate portion 16 due to a biasing force of the rotational direction biasing portion 21 described later. Formed in the first plate portion 16 is a guide piece portion 16A protruding outward in the disc axial direction from an end portion of the first plate portion 16 in the disc axial direction. The guide piece portion 16A functions as a guide for the ear portion 7B of the friction pad 6 when the ear portion 7B is inserted in (fitted in) the guide plate portion 15 of the pad spring 10.

The second plate portion 17 of the guide plate portion 15 faces the first plate portion 16 in the disc radial direction. The first plate portion 16 and the second plate portion 17 are disposed across the bottom plate portion 18 from each other in the disc radial direction. The second plate portion 17 includes a main leg portion 17A and a sub leg portion 17B extending inward in the disc rotational direction from an inner end of the bottom plate portion 18 in the disc radial direction. The main leg portion 17A and the sub leg portion 17B are spaced away from each other in the disc axial direction and allowed to contact the inner wall portion 3B of the pad guide 3. The radially biasing portion 19 and the rotational direction biasing portion 21, both described later, are integrally formed in the second plate portion 17. That is, the radially biasing portion 19 described later is integrally formed in the main leg portion 17A. The rotational direction biasing portion 21 described later is integrally formed in the main leg portion 17A and the sub leg portion 17B. As clearly illustrated in FIG. 7, length L1 of the main leg portion 17A in the disc axial direction, which is located away from the disc 1, is larger than length L2 of the sub leg portion 17B in the disc axial direction, which is located close to the disc 1. According to the present embodiment, the length L1 of the main leg portion 17A in the disc axial direction is substantially twice as long as the length L2 of the sub leg portion 17B in the disc axial direction.

The bottom plate portion 18 of the guide plate portion 15 extends inward in the disc radial direction from the first plate portion 16. The bottom plate portion 18 comes into contact with the bottom portion 3C of the pad guide 3 when the pad spring 10 is mounted on the pad guide 3 of the mounting member 2. The rotational direction lateral surface 7B3 of the ear portion 7B of the friction pad 6 faces the bottom plate portion 18.

When the brake is applied on the vehicle traveling backward (while the disc 1 rotates in the opposite direction to the direction of the arrow A1), the friction pad 6 is pulled in the opposite direction to the direction of the arrow A, which brings the rotational direction lateral surface 7B3 of the ear portion 7B, which is located on the disc inward-rotation side, into contact with the bottom plate portion 18. When the brake is applied on the vehicle traveling forward (while the disc 1 rotates in the direction of the arrow A), the friction pad 6 is pulled in the direction of the arrow A1, which brings the rotational direction lateral surface 7B3 of the ear portion 7B, which is located on the disc outward-rotation side, into contact with the bottom plate portion 18.

Formed in the bottom plate portion 18 is a guide plate 18A extending outward in the disc axial direction. The guide plate 18A extends in the same plane as the bottom plate portion 18. The guide plate 18A is provided to smoothly guide the ear portion 7B of the friction pad 6 to an inside of the guide plate portion 15 when the ear portion 7B is inserted in the guide plate portion 15.

Further formed in the bottom plate portion 18 is a claw portion 18B protruding from an inner end portion of the bottom plate portion 18 in the disc radial direction toward the second plate portion 17. The claw portion 18B is formed into a claw piece having a substantially U-like shape protruding toward an inside of an open portion 20 described later. A distal end side of the claw portion 18B is latched to the inner wall portion 3B of the pad guide 3 in an elastically deformed state. The claw portion 18B elastically pushes the first plate portion 16 of the guide plate portion 15 toward the outer wall portion 3A of the pad guide 3 using a reaction force from the inner wall portion 3B, to thereby maintain the guide plate portion 15 in a retained state within the pad guide 3.

The radially biasing portion 19 has a proximal end side that is integrally formed in the main leg portion 17A of the second plate portion 17 and a distal end side that extends in the disc axial direction so as to be arranged between the second plate portion 17 and the ear portion 7B of the friction pad 6 in an elastically deformed state. The radially biasing portion 19 elastically biases the ear portion 7B of the friction pad 6 toward the first plate portion 16. The radially biasing portion 19 comprises an extending portion 19A having a proximal end side that is connected to the outer side of the main leg portion 17A in the disc axial direction (a position located in a direction away from the disc 1) and extends outward in the disc axial direction, an arc-like folded portion 19B that is folded from a distal end of the extending portion 19A outward in the disc radial direction into a substantially U-like or substantially C-like shape, and a pressing portion 19C that extends from a distal end of the folded portion 19B at an angle outward in the disc radial direction.

The pressing portion 19C of the radially biasing portion 19 is formed into an elongated plate-like spring piece. The pressing portion 19C has a distal end side that is a free end extending to a position above the second plate portion 17 of the guide plate portion 15. The pressing portion 19C undergoes a flexural deformation in an elastic manner so as to be pushed toward the second plate portion 17 of the guide plate portion 15 when the ear portion 7B of the friction pad 6 is incorporated into the guide plate portion 15 (see FIGS. 2 to 4).

The pressing portion 19C is arranged to extend in the disc axial direction between the second plate portion 17 of the guide plate portion 15 and the ear portion 7B of the friction pad 6. The pressing portion 19C uses an elastic reaction force generated due to the foregoing arrangement to bias the ear portion 7B of the friction pad 6 outward in the disc radial direction, that is, in a direction of an arrow B in FIG. 4. The ear portion 7B of the friction pad 6 is thus elastically pushed toward the first plate portion 16 of the guide plate portion 15 (outer wall portion 3A of the pad guide 3) due to the biasing force (elastic reaction force) of the radially biasing portion 19. This prevents or reduces backlash of the ear portion 7B of the friction pad 6 within the pad guide 3 (guide plate portion 15) in the direction of the arrow B in FIG. 4, which reduces abnormal noises (rattling noises) generated by displacement of the friction pads 6, for example, when the vehicle travels on a rough road or the like.

A protruding piece portion 19D is formed in a middle of the pressing portion 19C in a length direction of the pressing portion 19C. The protruding piece portion 19D is bent inward in the disc radial direction. The protruding piece portion 19D is arranged at a position corresponding (opposite) to the open portion 20 described later. The protruding piece portion 19D therefore comes into elastic contact with the inner wall portion 3B of the pad guide 3 when the pressing portion 19C of the radially biasing portion 19 is displaced toward the second plate portion 17 of the guide plate portion 15 (inward in the disc radial direction). The pressing portion 19C does not contact the second plate portion 17, preventing the second plate portion 17 and other portions from being applied with excessive stress.

The open portion 20 formed in the second plate portion 17 and the rotational direction biasing portion 21 integrally formed in the second plate portion 17 are discussed below.

The open portion 20 is formed at a position surrounded by the inner end of the bottom plate portion 18 in the disc radial direction, the main leg portion 17A, the sub leg portion 17B, and the rotational direction biasing portion 21. Since the main leg portion 17A and the sub leg portion 17B differ from each other in the length in the disc axial direction (L1>L2), the open portion 20 is formed at a position shifted inward in the disc axial direction from (closer to the disc 1 than) a middle position C1 in the disc axial direction in the length in the disc axial direction of the second plate portion 17 as illustrated in FIG. 5. In other words, a middle position C2 of the open portion 20 in the disc axial direction is arranged closer to the disc 1 than the middle position C1 of the second plate portion 17 in the disc axial direction. The open portion 20 is formed into a cut-away hole having a substantially rectangular shape. The open portion 20 is formed to extend from the bottom plate portion 18 to the rotational direction biasing portion 21 described later in the disc rotational direction. The open portion 20 allows the protruding piece portion 19D to extend through the open portion 20 and come into contact with the inner wall portion 3B of the pad guide 3 when the pressing portion 19C of the radially biasing portion 19 is displaced toward the second plate portion 17. Since the open portion 20 is formed close to the disc 1, the biasing force applied to the friction pad 6 of the rotational direction biasing portion 21 described later is varied according to the position of the friction pad 6 in the disc axial direction.

The rotational direction biasing portion 21 is bent inward in the disc radial direction from an inner end of the second plate portion 17 in the disc rotational direction. In other words, the rotational direction biasing portion 21 is bent inward in the disc radial direction from distal ends of the main leg portion 17A and the sub leg portion 17B where the bottom plate portion 18 is a proximal end of the main leg portion 17A and of the sub leg portion 17B. The rotational direction biasing portion 21 is formed into a spring piece having a wide plate-like shape, which is bent along the entire length of the second plate portion 17 in the disc axial direction. The rotational direction biasing portion 21 comes into elastic contact with the contact surface portion 7A1 of the main body portion 7A of the friction pad 6 (backing plate 7).

The rotational direction biasing portion 21 located on the disc inward-rotation side thus biases the contact surface portion 7A1 of the friction pad 6 inward in the disc rotational direction (direction of the arrow A1 in FIG. 4). The rotational direction biasing portion 21 located on the disc outward-rotation side biases the contact surface portion 7A1 of the friction pad 6 inward in the disc rotational direction (opposite direction to the direction of arrow A1 in FIG. 4). In short, the rotational direction biasing portions 21 located on the disc inward-rotation side and the disc outward-rotation side bias the friction pad 6 toward a center of the friction pad 6. This prevents or reduces the backlash of the friction pad 6 in the disc rotational direction, which reduces the abnormal noises (rattling noises) generated by the displacement of the friction pad 6, for example, when the vehicle travels on a rough road or the like.

When the brake is not applied, the friction pads 6 are located in a center portion of the mounting member 2 in the disc rotational direction. In other words, neither of the ear portions 7B of the friction pad 6 is pressed against the bottom portion 3C of the pad guide 3. It is possible to decrease a moving distance at which the friction pad 6 moves toward the bottom portion 3C of the pad guide 3 by making a sliding contact with the disc 1 when the brake is applied while the vehicle travels forward or backward. This reduces abnormal noises including a hitting sound (clonking noise) generated when the ear portions 7B of the friction pad 6 hit the bottom plate portion 18 of the pad spring 10 (bottom portion 3C of the pad guide 3).

As illustrated in FIGS. 5 and 7, the rotational direction biasing portion 21 comprises a main biasing portion 21A arranged further outside in the disc axial direction than the open portion 20, a sub biasing portion 21B arranged across the open portion 20 from the main biasing portion 21A further inside in the disc axial direction than the main biasing portion 21A, and a connecting portion 21C connecting the main biasing portion 21A and the sub biasing portion 21B.

The main biasing portion 21A of the rotational direction biasing portion 21 is arranged between the open portion 20 and the extending portion 19A of the radially biasing portion 19. The main biasing portion 21A is formed to have a length dimension L1 in the disc axial direction. In other words, the main biasing portion 21A is integrally connected to the inner end of the second plate portion 17 in the disc rotational direction, which is located further outside in the disc axial direction than the open portion 20. The sub biasing portion 21B of the rotational direction biasing portion 21 is arranged closer to the disc 1 than the open portion 20 and formed to have a length dimension L2 in the disc axial direction. The sub biasing portion 21B is integrally connected to the inner end of the second plate portion 17 in the disc rotational direction, which is located further inside in the disc axial direction than the open portion 20.

Since the open portion 20 is formed at the position shifted inward in the disc axial direction from the middle position of the second plate portion 17 in the disc axial direction, the length dimension L2 of the sub biasing portion 21B is shorter than the length dimension L1 of the main biasing portion 21A (L2<L1). The sub biasing portion 21B therefore biases the friction pad 6 inward in the disc rotational direction more weakly than the main biasing portion 21A does. In other words, since the length L1 of the main leg portion 17A in the disc axial direction, which supports the main biasing portion 21A, differs from the length L2 of the sub leg portion 17B in the disc axial direction, which supports the sub biasing portion 21B, the main leg portion 17A and the sub leg portion 17B differ from each other in support stiffness. Since the length L1 of the main leg portion 17A in the disc axial direction is longer, the main biasing portion 21A is high in support stiffness, whereas the sub biasing portion 21B is relatively low in support stiffness. Due to the difference in support stiffness, the biasing force applied to the friction pad 6 by the sub biasing portion 21B is smaller than the biasing force applied to the friction pad 6 by the main biasing portion 21A.

In this case, the main biasing portion 21A and the sub biasing portion 21B are connected together in the disc axial direction through the connecting portion 21C. The rotational direction biasing portion 21 is so formed that the biasing force decreases from the main biasing portion 21A toward the sub biasing portion 21B. In other words, the rotational direction biasing portion 21 is so formed that the biasing force applied toward the inner side in the disc rotational direction decreases from the outer side in the disc axial direction toward the inner side in the disc axial direction.

As illustrated in FIG. 2, if the lining 8 of the friction pad 6 is new, thickness of the lining 8 in the disc axial direction is a dimension L3 that is substantially large, and mass of the lining 8 is large. In this case, the ear portion 7B of the friction pad 6 is located closer to the outside in the disc axial direction in relation to the guide plate portion 15 of the pad spring 10. This allows the rotational direction biasing portion 21 to apply a sufficient biasing force to the friction pad 6 inward in the disc rotational direction.

As illustrated in FIG. 3, when the lining 8 of the friction pad 6 is abraded, the thickness dimension of the lining 8 in the disc axial direction becomes a dimension L4 that is smaller than the dimension L3 at the time when the lining 8 is new, and the mass of the lining 8 is also decreased. When this happens, the position of the ear portion 7B of the friction pad 6 is closer to the inside in the disc axial direction in relation to the guide plate portion 15 of the pad spring 10. In other words, the ear portion 7B of the friction pad 6 moves inward in the disc axial direction from a position where the ear portion 7B is located when the lining 8 is new (shown by dotted lines in FIG. 3) by an amount of $\Delta L5(L3-L4)$ that is equivalent to an amount of abrasion of the lining 8.

When the lining 8 of the friction pad 6 is abraded, therefore, the rotational direction biasing portion 21 biases the friction pad 6 inward in the disc rotational direction with a smaller biasing force as compared to when the lining 8 is new. Since the mass of the friction pad 6 is decreased, it is possible to apply a minimum necessary biasing force to the friction pad 6 even if the biasing force of the rotational direction biasing portion 21 is reduced, and thus reduce the generation of abnormal noises including a clonking noise, a rattling noise, and the like. The reduction of the biasing force of the rotational direction biasing portion 21 allows the friction pad 6 to smoothly move toward the disc 1 when the brake is applied, stabilizing an attitude of the friction pad 6 and reducing the generation of the abnormal noises caused by a brake noise, a judder, and the like.

The disc brake according to the present embodiment is thus configured. Operation of the disc brake is now discussed.

When the brake of the vehicle is applied, a hydraulic brake pressure is supplied to the inner leg portion 4A (cylinder) of the caliper 4 to displace the piston 4D toward the disc 1 in a sliding manner, to thereby press the friction pad 6 on the inner side against one side face of the disc 1. The caliper 4 then receives a pressure reaction force from the disc 1, so that the entire caliper 4 is displaced in a sliding manner to the inner side relative to the arm portions 2A of the mounting member 2, causing the outer leg portion 4C to press the friction pad 6 on the outer side against the other side face of the disc 1.

Consequently, the friction pads 6 on the inner and outer sides firmly hold the disc 1 therebetween from both sides in the axial direction while the disc 1 rotates in the direction of the arrow A in FIG. 1 (when the vehicle travels forward). The friction pads 6 thus apply a braking force to the disc 1. When the brake application is released, the hydraulic pressure supply to the piston 4D is discontinued. The friction pads 6 on the inner and outer sides from the disc 1 then move away from the disc 1 and return into a non-braking state.

According to the aforementioned conventional art, the rotational direction biasing portion of the pad spring located on the disc inward-rotation side presses the friction pad toward the disc outward-rotation side. When the friction pad is at the initial position (standby position), therefore, the ear portion of the friction pad located on the disc outward-rotation side is elastically pushed against the bottom portion of the pad guide. In such a case, when the brake is applied on the vehicle traveling backward, the friction pad is pulled by the disc to be moved (displaced) to the disc inward-rotation side (disc outward-rotation side in a situation where the vehicle travels backward). It is therefore likely that the ear portion of the friction pad hits the bottom portion of the pad guide located on the disc inward-rotation side to generate the abnormal noises including a hitting sound (clonking noise) or the like.

According to the present embodiment, the pad springs 10 are disposed in both the disc inward-rotation side and the disc outward-rotation side. One of the contact surface portions 7A1, 7A1 of the friction pad 6, which is located on the disc inward-rotation side, is biased inward in the disc rotational direction (direction of the arrow A1 in FIG. 4) by the rotational direction biasing portion 21 of the pad spring 10 located on the disc inward-rotation side. The contact surface portion 7A1 located on the disc outward-rotation side is biased inward in the disc rotational direction (opposite direction to the direction of the arrow A1 in FIG. 4) by the rotational direction biasing portion 21 of the pad spring 10 located on the disc outward-rotation side.

The friction pad 6 is located at a center of the mounting member 2 in the disc rotational direction when the brake is applied. To be specific, when the friction pad 6 is at the initial position (standby position), neither the ear portion 7B on the disc inward-rotation side nor the ear portion 7B on the disc outward-rotation side is pushed against the bottom portion 3C of the pad guide 3. When the brake is applied on the vehicle traveling forward, the friction pad 6 moves to the disc outward-rotation side (left side on FIG. 1). When the brake is applied on the vehicle traveling backward, the friction pad 6 moves to the disc inward-rotation side (right side on FIG. 1).

In this connection, since the friction pad 6 is located at the center of the mounting member 2 in the disc rotational direction, it is possible to reduce a moving amount by which the friction pad 6 is pulled by the disc 1 as a result of brake application. This prevents or reduces the abnormal noises including a clonking noise and other like noises generated when the ear portions 7B of the friction pad 6 hit the bottom portions 3C of the pad guides 3.

According to the aforementioned conventional art, the biasing force of the rotational direction biasing portion, which is applied to the friction pads when the friction pads are new, is determined as a normal biasing force. The conventional art applies a constant biasing force to the friction pads in the disc axial direction. When the linings of the friction pads are abraded, the mass of the friction pads is reduced, and an excessive biasing force is applied to the friction pads by the rotational direction biasing portions. This might cause a brake noise, a judder and the like, generating the abnormal noises.

To solve the foregoing, the present embodiment varies a magnitude of the biasing force applied to the friction pads 6 according to positions in the rotational direction biasing portion 21 in the disc axial direction. Specifically, the rotational direction biasing portion 21 is so formed that the biasing force of the rotational direction biasing portion 21 is smaller at a position close to the disc 1 in the disc axial direction, as compared to a position away from the disc 1 in the disc axial direction.

More specifically, the rotational direction biasing portion 21 is bent inward in the disc radial direction from the inner end of the second plate portion 17 in the disc rotational direction. In this case, the open portion 20 is formed in the second plate portion 17 at the position shifted inward in the disc axial direction from the middle position in the disc axial direction. The rotational direction biasing portion 21 comprises the main biasing portion 21A arranged further outside in the disc axial direction than the open portion 20, and the sub biasing portion 21B arranged across the open portion 20 from the main biasing portion 21A to be located on the inner side in the disc axial direction and configured to apply a smaller biasing force than the main biasing portion 21A.

The main biasing portion 21A and the sub biasing portion 21B are connected together through the connecting portion 21C. The biasing force of the rotational direction biasing portion 21 is smaller on the side closer to the disc 1 than on the side away from the disc 1 in the disc axial direction.

As illustrated in FIG. 2, when the lining 8 of the friction pad 6 is new (not abraded), for example, the initial position of the ear portion 7B of the friction pad 6 is located closer to the outside in the disc axial direction in relation to the guide plate portion 15 of the pad spring 10. As the thickness dimension L3 of the lining 8 is large when the lining 8 is new, the initial position of the friction pad 6 is closer to the main biasing portion 21A of the rotational direction biasing portion 21. This allows the rotational direction biasing portion 21 to apply a sufficient biasing force to the friction pad 6.

As illustrated in FIG. 3, when the lining 8 of the friction pad 6 is abraded, for example, the initial position of the ear portion 7B of the friction pad 6 is located closer to the inside in the disc axial direction in relation to the guide plate portion 15 of the pad spring 10. In other words, the lining 8 is reduced in thickness dimension from L3 to L4 when abraded, so that the initial position of the friction pad 6 approaches the disc 1, for example, by an amount Δ5(L3−L4) as compared to when the lining 8 is new. The rotational direction biasing portion 21 applies a smaller biasing force to the friction pad 6 than it does when the friction pad 6 is new.

In this case, the lining 8 of the friction pad 6 is decreased in mass by an amount equivalent to the abrasion thereof. Even if the rotational direction biasing portion 21 applies the smaller biasing force to the friction pad 6 than it does when the friction pad 6 is new, the backlash of the friction pad 6 is adequately prevented or reduced. This prevents or reduces the generation of the abnormal noises including a clonking noise, a rattling noise, and other like noises.

The reduction of the biasing force of the rotational direction biasing portion 21 allows a smooth sliding displacement of the friction pad 6 toward the disc 1 when the brake is applied and thus improves a contact stability and slidability of the friction pad 6. Consequently, the attitude of the friction pad 6 is stabilized, which reduces the generation of the abnormal noises caused by a brake noise, a judder, and the like.

According to the present embodiment, the rotational direction biasing portion 21 varies the biasing force according to an abrasion status of the friction pad 6. To be more specific, when the initial position of the friction pad 6 moves toward the disc 1 due to the abrasion of the friction pad 6, the rotational direction biasing portion 21 applies the minimum necessary biasing force to the friction pad 6 to reduce the generation of the clonking noise or the like. The reduction of the biasing force of the rotational direction biasing portion 21 prevents the friction pad 6 from being applied with an excessive biasing force even when the friction pad 6 is abraded. This prevents a deterioration in brake noise and judder performance of the friction pad 6. The rotational direction biasing portion 21 of the pad spring 10 is capable of delivering both the performances of clonking and brake noises and other like noises according to a condition of the friction pad 6.

The foregoing embodiment is discussed, taking as an example the case in which the pad springs 10 are mounted on the respective arm portions 2A of the mounting member 2. The invention, however, does not necessarily have to be thus configured. The invention may be so configured, for example, that the pad spring 10 is mounted on at least one of the arm portions 2A of the mounting member 2. In other words, the pad spring 10 is provided on the disc inward-rotation side, and an existing pad spring without the rotational direction biasing portion 21 may be utilized on the disc outward-rotation side. In such a case, a friction pad is constantly pushed against a bottom portion of a pad guide located on the disc outward-rotation side, to thereby prevent or reduce the generation of abnormal noises including a clonking noise and other like noises.

The foregoing embodiment is discussed, taking as an example the case in which the pad spring 10 is used, which is connected to the outer and inner sides of the arm portions 2A of the mounting member 2 through the connecting plate portion 11. The invention, however, does not necessarily have to be thus configured. For example, there may be pad springs separately disposed on the outer side and the inner side.

The foregoing embodiment is discussed, taking as an example the disc brake of a so-called floating-caliper type in which the piston 4D is slidably disposed in the inner leg portion 4A of the caliper 4 through the cylinder, and the outer leg portion 4C of the caliper 4 is brought into contact with the friction pad 6 located on the outer side. The invention, however, does not necessarily have to be thus configured. The invention may be applied, for example, to a disc brake of a so-called opposed-piston type in which pistons are disposed on inner and outer sides of a caliper.

Disc brakes according to the above-discussed embodiment include, for example, those according to the following modes.

A disc brake according to a first mode comprises a mounting member including a pair of arm portions spaced away from each other in a rotational direction of a disc and extending over an outer circumferential side of the disc in a disc axial direction, the arm portions being provided with pad guides; a caliper slidably disposed in the arm portions of the mounting member; a pair of friction pads including ear portions inserted in the pad guides of the mounting member, the pair of friction pads being pressed by the caliper against respective surfaces of the disc; and a pair of pad springs mounted on the respective arm portions of the mounting member and configured to elastically support the pair of friction pads between the arm portions. At least one of the pair of pad springs includes a guide plate portion for guiding the ear portion of a corresponding one of the pair of friction pads in the disc axial direction, the guide plate portion including a first plate portion extending along a radially outer surface of the ear portion in the disc axial direction, a second plate portion extending along a radially inner surface of the ear portion in the disc axial direction, and a bottom plate portion extending in the disc axial direction along a lateral surface of the ear portion in a rotational direction; a radially biasing portion including a proximal end side formed integrally with the second plate portion and a distal end side, the radially biasing portion extending in the disc axial direction between the second plate portion and the ear portion of the friction pad with the distal end side elastically deformed to elastically bias the ear portion of the friction pad toward the first plate portion; and a rotational direction biasing portion that is bent from an inner end of the second plate portion in the disc rotational direction to an inner side in a disc radial direction and biases the friction pad in the disc rotational direction. The second plate portion is provided with an open portion at a position shifted inward from a middle position in the disc axial direction. The rotational direction biasing portion includes a main biasing portion arranged further outside in the disc axial direction than the open portion and configured to bias the friction pad inward in the disc rotational direction and a sub biasing portion arranged across the open portion away from the main biasing portion further inside in the disc axial direction than the main biasing portion and configured to bias the friction pad inward in the disc rotational direction with a smaller force than the main biasing portion.

A disc brake according to a second mode comprises a mounting member including pad guides in which ear portions of a pair of friction pads are arranged, the pad guides being spaced away from each other in a disc rotational direction; a caliper slidably disposed in the arm portions of the mounting member and configured to press the pair of friction pads against respective surfaces of the disc; and a pair of pad springs mounted on the pad guides of the mounting member and configured to elastically support the pair of friction pads. At least one of the pair of pad springs comprises a guide plate portion in which the ear portion of a corresponding one of the pair of friction pads is arranged, the guide plate portion being larger in length in a disc axial direction than the ear portion; and a rotational direction biasing portion extending from the guide plate portion toward a center in the disc rotational direction and configured to bias the corresponding friction pad in the disc rotational direction. The guide plate portion includes a bottom plate portion disposed opposite an end surface of the ear portion in the disc rotational direction, and a first plate portion and a second plate portion disposed across the bottom plate portion, the first plate portion and the second plate portion facing each other in a disc radial direction. A pair of leg portions is formed in the second plate portion arranged on an inner side in the disc radial direction. The pair of leg portions extends from the bottom plate portion. The pair of leg portions includes a distal end connected to the rotational direction biasing portion. The leg portions are spaced away from each other in the disc axial direction. A first leg portion of the pair of leg portions, which is located away from the disc, is formed larger in the length in the disc axial direction than a second leg portion located closer to the disc.

In a third mode according to the second mode, an open portion is formed between the first leg portion and the second plate portion. A middle position of the open portion in the disc axial direction is arranged closer to the disc than a middle position of the second plate portion in the disc axial direction.

A disc brake according to a fourth mode comprises a mounting member including a pair of arm portions spaced away from each other in a rotational direction of a disc and extending over an outer circumferential side of the disc in a disc axial direction, the arm portions being provided with pad guides; a caliper slidably disposed in the arm portions of the mounting member; a pair of friction pads including ear portions inserted in the pad guides of the mounting member, the pair of friction pads being pressed by the caliper against respective surfaces of the disc; and a pair of pad springs mounted on the arm portions of the mounting member and configured to elastically support the pair of friction pads between the arm portions. The pair of pad springs each of which comprises a guide plate portion in which the ear portion of a corresponding one of the pair of friction pads is arranged, the guide plate portion being larger in length in the disc axial direction than the ear portion; and a rotational direction biasing portion extending from the guide plate portion toward a center in the disc rotational direction and configured to bias the friction pad in the disc rotational direction. The guide plate portion includes a bottom plate portion disposed opposite an end surface of the ear portion in the disc rotational direction, and a first plate portion and a second plate portion disposed across the bottom plate portion, the first plate portion and a second plate portion facing each other in a disc radial direction. The second plate portion arranged on an inner side in the disc radial direction is provided with an open portion. A middle position of the open portion in the disc axial direction is arranged closer to the disc than a middle position of the second plate portion in the disc axial direction.

Although some embodiments of the invention are discussed above, the embodiments are not intended to limit the invention but to facilitate the understanding of the invention. The invention may be modified or improved without deviating from the gist thereof and includes equivalents thereof. The constituent elements mentioned in the claims and description may be combined in any ways or omitted within a scope where the aforementioned problem can be at least partially solved or a scope where the advantageous effects are at least partially provided.

The present application claims priority under Japanese Patent Application No. 2017-128874 filed on Jun. 30, 2017. The entire disclosure of Japanese Patent Application No. 2017-128874 filed on Jun. 30, 2017 including the description, claims, drawings and abstract, is incorporated herein by reference in its entirety.

REFERENCE SIGN LIST

1: Disc
2: Mounting member
2A: Arm portion
3: Pad guide
4: Caliper
6: Friction pad
7B: Ear portion
7B1: Radially outer surface
7B2: Radially inner surface
7B3: Rotational direction lateral surface
10: Pad spring
15: Guide plating portion
16: First plate portion
17: Second plate portion
17A: Main leg portion
17B: Sub leg portion
18: Bottom plate portion
19: Radially biasing portion
20: Open portion
21: Rotational direction biasing portion
21A: Main biasing portion
21B: Sub biasing portion

The invention claimed is:
1. A disc brake comprising:
a mounting member including a pair of arm portions spaced away from each other in a rotational direction of a disc and extending over an outer circumferential side of the disc in a disc axial direction, the arm portions being provided with pad guides;
a caliper slidably disposed in the arm portions of the mounting member;
a pair of friction pads including ear portions inserted in the pad guides of the mounting member, the pair of friction pads being pressed by the caliper against respective surfaces of the disc; and
a pair of pad springs mounted on the arm portions of the mounting member and configured to elastically support the pair of friction pads between the arm portions,
at least one of the pair of pad springs including:
a guide plate portion for guiding the ear portion of a corresponding one of the pair of friction pads in the disc axial direction, the guide plate portion including a first plate portion extending along a radially outer surface of the ear portion in the disc axial direction, a second plate portion extending along a radially inner surface of the ear portion in the disc axial direction, and a bottom plate portion extending in the disc axial direction along an inner surface of the ear portion in a rotational direction;
a radially biasing portion including a proximal end side formed integrally with the second plate portion and a distal end side, the radially biasing portion extending in the disc axial direction between the second plate portion and the ear portion of the friction pad with the distal end side elastically deformed to elastically bias the ear portion of the friction pad toward the first plate portion; and
a rotational direction biasing portion that is bent inward in a disc radial direction from an inner end of the second plate portion in the disc rotational direction, the rotational direction biasing portion being configured to bias the friction pad in the disc rotational direction,
the second plate portion being provided with an open portion that is formed at a position shifted inward in the axial direction of the disc from a middle position of the length in the disc axial direction of the second plate portion, the rotational direction biasing portion including:

a main biasing portion arranged further outside in the disc axial direction than the open portion and configured to bias the friction pad inward in the disc rotational direction; and a sub biasing portion arranged across the open portion away from the main biasing portion further inside in the disc axial direction than the main biasing portion and configured to bias the friction pad inward in the disc rotational direction with a smaller force than the main biasing portion.

2. A disc brake comprising:

a mounting member including pad guides in which respective ear portions of a pair of friction pads are arranged, the pad guides being spaced away from each other in a disc rotational direction;

a caliper slidably disposed in the arm portions of the mounting member and configured to press the pair of friction pads against respective surfaces of the disc; and a pair of pad springs mounted on the pad guides of the mounting member and configured to elastically support the pair of friction pads, at least one of the pair of pad springs comprising:

a guide plate portion in which the ear portion of a corresponding one of the pair of friction pads is arranged, the guide plate portion being larger in length in a disc axial direction than the ear portion; and a rotational direction biasing portion that extends from the guide plate portion toward a center in the disc rotational direction and configured to bias the corresponding friction pad in the disc rotational direction, the guide plate portion including:

a bottom plate portion disposed opposite an end surface of the ear portion in the disc rotational direction, and a first plate portion and a second plate portion disposed across the bottom plate portion, the first plate portion and the second plate portion facing each other in a disc radial direction, wherein a pair of leg portions extending from the bottom plate portion is formed in the second plate portion arranged on an inner side in the disc radial direction so that the leg portions are spaced away from each other in the disc axial direction, the pair of leg portions including a distal end connected to the rotational direction biasing portion, and wherein a first leg portion of the pair of leg portions, which is located away from the disc, is formed larger in the length in the disc axial direction than a second leg portion located closer to the disc.

3. The disc brake according to claim 2, wherein an open portion is formed between the first leg portion and the second leg portion; and wherein a middle position of the open portion in the disc axial direction is arranged closer to the disc than a middle position of the second plate portion in the disc axial direction.

4. A disc brake comprising:

a mounting member including a pair of arm portions spaced away from each other in a rotational direction of a disc and extending over an outer circumferential side of the disc in a disc axial direction, the arm portions being provided with pad guides;

a caliper slidably disposed in the arm portions of the mounting member;

a pair of friction pads including ear portions inserted in the pad guides of the mounting member, the pair of friction pads being pressed by the caliper against respective surfaces of the disc; and a pair of pad springs mounted on the arm portions of the mounting member and configured to elastically support the pair of friction pads between the arm portions, the pair of pad springs each of which comprising:

a guide plate portion in which the ear portion of a corresponding one of the pair of friction pads is arranged, the guide plate portion being larger in length in the disc axial direction than the ear portion; and a rotational direction biasing portion extending from the guide plate portion toward a center in the disc rotational direction and configured to bias the friction pad in the disc rotational direction, the guide plate portion including:

a bottom plate portion disposed opposite an end surface of the ear portion in the disc rotational direction, and a first plate portion and a second plate portion disposed across the bottom plate portion, the first plate portion and the second plate portion facing each other in a disc radial direction, wherein an open portion is provided in the second plate portion arranged on an inner side in the disc radial direction, and a middle position of the open portion in the disc axial direction is arranged closer to the disc than a middle position of the second plate portion in the disc axial direction.

* * * * *